Aug. 15, 1944.     T. C. WETHERBY     2,356,113
CONTROL SYSTEM
Filed Oct. 28, 1942
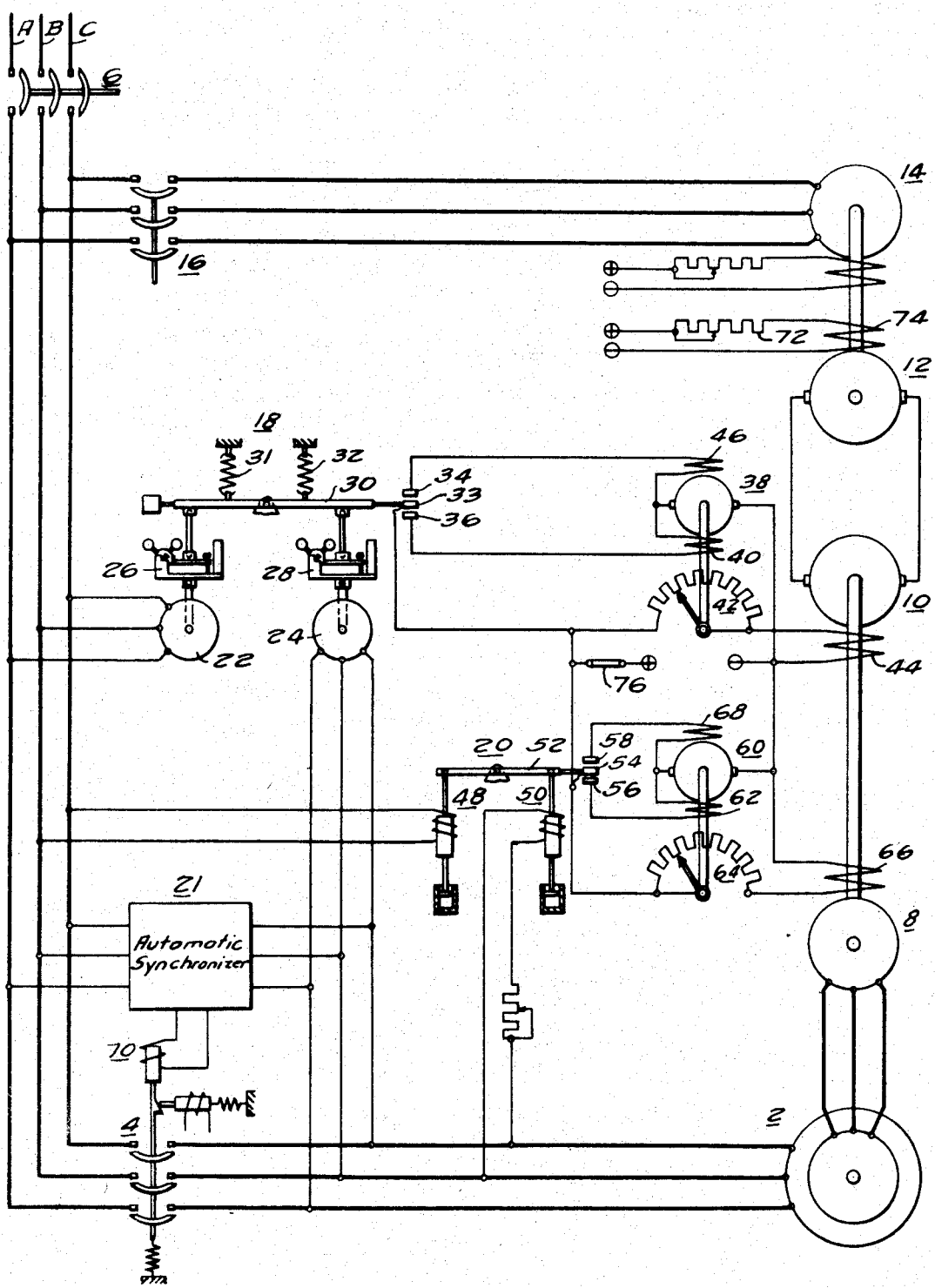
WITNESSES:
E. A. McCloskey
Joe Weber
INVENTOR
Tracy C. Wetherby.
BY
G. M. Crawford
ATTORNEY Patented Aug. 15, 1944

2,356,113

UNITED STATES PATENT OFFICE 2,356,113

CONTROL SYSTEM

Tracy C. Wetherby, Forest Hills, Pa., assignor to Westinghouse Electric & Manufacturing Company, East Pittsburgh, Pa., a corporation of Pennsylvania Application October 28, 1942, Serial No. 463,612

8 Claims. (Cl. 172—274)

The present invention relates, generally, to control systems, and, more particularly, to control systems for starting variable speed wound-rotor induction motors.

Known systems for starting and varying the speed of a wound-rotor induction motor function to control the motor by connecting its rotor winding to an alternating-current machine which is connected in driving relation to a direct-current machine, and varying the energization of the direct-current machine. In such systems, it is necessary that the frequency and magnitude of the potential induced in the stator winding and that of the potential of the source of power to which the stator is to be connected be substantially the same, and that there be predetermined phase relations between these potentials before the stator is connected to the source of power.

An object of the present invention is to provide a control system for starting a wound-rotor induction motor which shall function to automatically provide the desired starting potential and frequency conditions in one of the motor windings and which shall energize the other winding in response to predetermined conditions of energization of the windings of the motor.

Other objects and advantages of the invention will be apparent from the following detailed description taken in connection with the accompanying drawing the single figure of which is a diagrammatic representation of an induction motor control system embodying the principal features of the invention.

In practicing the invention, a wound rotor induction motor 2 has its stator windings disposed to be connected to a source of alternating-current power indicated by the conductors A—B—C, by means of circuit control devices 4 and 6. The rotor winding of the motor 2 is connected to an alternating-current machine 8 which, in turn, is connected in driving relation with a direct-current machine 10. The machine 10 is electrically connected to a direct-current machine 12 which, in turn, is connected in driving relation with an alternating-current machine 14. The machine 14 may be connected to the source of alternating-current power A—B—C through circuit control devices 16 and 6. The machines 8, 10, 12 and 14 may operate as motors or generators depending upon the direction of power flow to or from the motor 2.

A frequency differential responsive device 18 is disposed to vary the excitation of the machine 10 in response to differences in the frequencies of the potential of the source of power and the potential in the stator winding of the motor 2. A potential differential responsive device 20 is disposed to vary the excitation of the machine 8 in response to the difference between the potentials on the stator winding of the motor 2 and the source of power. An automatic synchronizer 21 is connected as indicated to close the circuit control device 4 when the proper potential, frequency and phase relations exist between the potentials on the stator winding and the source of power.

Considering the invention more in detail, the frequency differential responsive device 18 comprises a pair of synchronous motors 22 and 24 which are disposed to be energized from the source of power A—B—C and the stator winding of the induction motor 2, respectively. The synchronous motors 22 and 24 are connected to drive centrifugal devices 26 and 28 which act upon a pivoted arm 30 against the centering bias of spring members 31 and 32. The contact element 33 is disposed to be actuated by the pivoted arm 30 and to engage fixed contact elements 34 and 36 when moved in an upper or a lower direction by the arm 30.

When the frequency of the source of power A—B—C is greater than that of the potential induced in the stator windings of the induction motor 2, the motor 22 will rotate faster than the motor 24 and the contact elements 33 and 36 will engage to energize a motor 38 and its field winding 40 to cause it to rotate in such a direction as to increase the effective resistance of a rheostat 42 actuated by the motor 38. This will decrease the energization of the field winding 44 of the direct-current machine 10 to thus increase the speed of the machine 10 and the alternating-current machine 8 to thereby increase the frequency of the output potential of the machine 8 and therefore the frequency of the potential induced in the stator windings of the induction motor 2.

When the frequency of the potential acting on the stator windings of the induction motor 2 is greater than that of the source of power A—B—C, the contact elements 33 and 34 will engage to energize the armature of the motor 38 and its field winding 46 to thereby actuate the motor 38 in a direction to decrease the effective resistance of the rheostat 42. This, in turn, will increase the excitation of the machine 10 and cause its speed to decrease thereby decreasing the frequency of the output potential of the machine.

The potential differential responsive device 20 comprises solenoids 48 and 50 connected to actuate a pivoted member 52 on which there is mounted a movable contact element 54. The contact element 54 is disposed to engage a contact element 56 when the potential of the source of power A—B—C, which is connected to energize the solenoid 48, is greater than the potential acting on the stator windings of the induction motor 2, which is connected to energize the solenoid 50.

The contact elements 54 and 56 are disposed to complete an energizing circuit for the armature of a reversible motor 60 and its field winding 62 to cause the motor 60 to actuate a rheostat 64 in a direction to decrease the effective resistance of the rheostat. This will increase the energization of the field winding 66 of the alternating-current machine 8 to thereby increase its output potential which, in turn, will increase the potential induced in the stator windings of the induction motor 2. The contact elements 54 and 58, when engaged, will energize a field winding 68 of the motor 60 and cause the motor to rotate in a direction to increase the effective resistance of the rheostat. 64 to thus decrease the output potential of the machine 8 which, in turn, will decrease the potential acting on the stator windings of induction motor 2.

The automatic synchronizer 21 may be any suitable device which will respond to the potential of the source of power A—B—C and the potential acting on the stator windings of the induction motor 2 to energize a closing solenoid 70 for the circuit control device 4 when the phase and frequency relations of the potentials acting on the synchronizer are suitable. Such an automatic synchronizer is shown and described in the patent to Gulliksen 1,977,384, issued October 16, 1934.

In the operation of the system, when it is desired to start the induction motor 2, the circuit control devices 6 and 16 may be closed in any suitable manner to energize the motor 14 which, in turn, will drive the direct-current generator 12. The direct-current machine 10 will be driven because of its energization by the machine 12 and the alternating-current machine 8 will be actuated in turn by the direct current machine 10.

Under these conditions the frequency differential responsive device 18 will function, as hereinbefore described, to so control the relative speeds of the machine 10 and the machine 8 as to produce a potential in the stator windings of the induction motor 2 of substantially the same frequency as that of the source of power A—B—C. The potential differential responsive device 20 will function as hereinbefore described to so control the excitation of the alternating current machine 8 as to produce such an output of the potential of the machine 8 as will cause a potential to be induced in the stator windings of the induction motor 2 substantially equal to the potential of the source of alternating-current power A—B—C.

When the potential values, phase relations and frequency relations between the potentials of the source of power A—B—C and the stator winding of the induction motor 2 are such as to permit closure of the circuit control device 4, the automatic synchronizer 21 will respond to these conditions to close the circuit control device 4 as hereinbefore described, thus connecting the stator winding of the induction motor 2 to the source of alternating-current power A—B—C.

The induction motor 2 will now act substantially the same as an unloaded transformer and it will not rotate for the reason that the potentials on its stator and rotor windings are of substantially the same frequency.

When it is desired to cause the motor 2 to rotate, the excitation of the direct-current machine 12 may be decreased by means of a variable resistor 72 in the circuit of its field winding 74 to thereby permit a power transfer from the induction motor 2 through the machine 8 acting as a synchronous motor, the direct-current machine 10 acting as a direct-current generator, the direct-current machine 12 acting as a direct-current motor, and the alternating-current machine 14 acting as an alternating-current generator back to the source of alternating-current power A—B—C. This altering of the conditions of the machines 8, 10, 12 and 14 will cause the induction motor 2 to rotate and its speed will be proportional to the reduction in the excitation of the direct-current machine 12.

After the circuit control device 4 has been closed to connect the stator winding of the induction motor 2 with the source of alternating-current power A—B—C, the frequency differential device 18 and the potential differential responsive device 20 may be rendered inoperative by actuating a circuit control device 76 to open circuit position to thus render inoperative the energizing circuits for the motors 38 and 60 which are controlled by the contact elements of the devices 18 and 20, respectively.

It is to be understood that the system will operate substantially the same if the stator and rotor windings of the induction motor 2 are reversed to provide connection of the stator winding of the induction motor 2 with the machine 8 and connection of the rotor winding of the induction motor 2 with the source of power A—B—C. The solenoid 50 of the potential differential responsive device 20 and the motor 24 of the frequency differential responsive device 18 in the righthand connections to the automatic synchronizer 21 may all be energized from the alternating-current machine 8 by direct connection to its conductors rather than through the induction motor 2, as shown in the drawing. It is further to be understood that the control of the speed of the direct-current machine 10 may be by means of the control of the excitation of the direct-current machine 12 by the rheostat 42 to thereby control the speed of the machine 10 by armature current control.

This it will be seen that I have provided a control system for starting a wound rotor induction motor which shall function to automatically provide the desired starting potential and frequency conditions in one of the motor windings and which shall energize the other winding in response to predetermined conditions of energization of the windings of the motor.

In compliance with the requirements of the patent statutes, I have shown and described herein a preferred embodiment of my invention. It is to be understood, however, that the invention is not limited to the precise construction shown and described but is capable of modification by one skilled in the art, the embodiment herein shown being merely illustrative of the principles of my invention.

I claim as my invention:

1. In a control system for a wound rotor induction motor, a main source of alternating-current power for energizing one of the motor windings, switch means operable to connect said one motor winding to the power source, an alternating-current generator connected to energize the other motor winding, a direct-current motor connected in driving relation with the alternating-current generator, power translating means connecting the motor to the power source, means responsive to the difference between the frequencies of the one induction motor winding and the power source for automatically controlling the speed of the direct-current motor, means responsive to the difference between the potentials of the one induction motor winding and the power source for automatically controlling the potential of the alternating-current generator, and means for automatically actuating the switch means to connect the said one induction motor winding to the power source in response to predetermined relations between the frequencies and potentials of the one induction motor winding and the power source.

2. In a control system for a wound rotor induction motor having stator and rotor windings, a main source of alternating-current power for energizing the stator winding, a motor generator set comprising an alternating-current generator connected to the rotor winding of the motor, a direct-current motor connected in driving relation with the alternating-current generator, power translating means connecting the motor to the power source, means responsive to variations in the proportionality between the potentials of the stator winding and the power source for automatically controlling the output potential of the alternating-current generator to cause the potential of the stator winding to match the potential of the power source, and means jointly responsive to the potentials of the power source and the stator winding for automatically connecting the stator winding to the power source when the potentials thereof are substantially equal.

3. In a control system for a wound rotor induction motor having stator and rotor windings, a main source of alternating-current power for the motor, switch means operable to connect the stator winding to the power source, an alternating-current generator directly connected to the rotor winding of the motor, a direct-current motor connected in driving relation with the alternating-current generator, power translating means connecting said direct-current motor to the power source to effect operation of the generator to energize said rotor winding, means jointly responsive to the frequencies of the power source and the stator winding for automatically controlling the speed of the direct-current motor to cause the frequency of the stator winding of the induction motor to match the frequency of the power source, means jointly responsive to the potential of the stator winding and the power source for automatically controlling the output potential of the alternating-current generator to cause the potential of said stator winding to match the potential of the power source, and means including synchronizer means connected between the power source and said stator winding operable to effect closure of said switch means to automatically connect the said stator winding to the power source when predetermined electrical relations exist therebetween.

4. In a control system for a wound rotor induction motor having stator and rotor windings, a main source of alternating-current power for the motor, switch means operable to connect the stator winding to the power source, an alternating-current generator directly connected to the rotor winding of the motor, a direct-current motor connected in driving relation with the alternating-current generator, power translating means connecting said direct-current motor to the power source to effect operation of the generator to energize said rotor winding, means jointly responsive to the frequencies of the power source and the stator winding for automatically controlling the speed of the direct-current motor to cause the frequency of the stator winding of the induction motor to match the frequency of the power source, means jointly responsive to the potentials of the stator winding and the power source for automatically controlling the output potential of the alternating-current generator to cause the potential of said stator winding to match the potential of the power source, means including synchronizer means connected between the power source and said stator winding operable to effect closure of said switch means to automatically connect the said stator winding to the power source when predetermined electrical relations exist therebetween, and means operable to control the operation of said power translating means to initiate the operation of the induction motor and control the speed thereof after it has been synchronized with the power source.

5. In a control system for a wound rotor induction motor having stator and rotor windings, switch means operable to connect said stator winding to a main source of alternating-current power, a first motor generator set comprising an alternating-current machine connected directly to said rotor winding and a direct-current machine, a second motor generator set comprising a direct-current machine connected in electrical relation with the direct-current machine of the first motor generator set and an alternating-current machine, means operable to connect the alternating-current machine of the second motor generator set to the main power source to cause the second motor generator set to operate the first motor generator set and thereby energize the said rotor winding and induce a voltage in the said stator winding, means jointly responsive to the frequencies of the main power source and the said stator winding operable to control the speed of the first motor generator set to cause the frequency of the voltage of the stator winding to match the frequency of the main power source, means jointly responsive to the potentials of the main power source and the stator winding operable to cause the potential of the stator winding to match the potential of the main power source, and synchronizer means connected between the stator winding and the main power source for automatically effecting the closure of said switch means to connect the stator winding to the main power source in response to a synchronous condition therebetween.

6. In a control system for a wound rotor induction motor having stator and rotor windings, switch means operable to connect said stator winding to a main source of alternating-current power, a first motor generator set comprising an alternating-current machine connected directly to said rotor winding and a direct-current machine, a second motor generator set comprising a direct-current machine connected in electrical relation with the direct-current machine of the first motor generator set and an alternating-current machine, means operable to connect the alternating-current machine of the second motor generator set to the main power source to cause the second motor generator set to operate the first motor generator set and thereby energize the said rotor winding and induce a voltage in the said stator winding, means jointly responsive to the frequencies of the main power source and the said stator winding operable to control the speed of the first motor generator set to cause the frequency of the voltage of the stator winding to match the frequency of the main power source, means jointly responsive to the potentials of the main power source and the stator winding operable to cause the potential of the stator winding to match the potential of the main power source, synchronizer means connected between the stator winding and the main power source for automatically effecting the closure of said switch means to connect the stator winding to the main power source in response to a synchronous condition therebetween, and means operable to vary the excitation of the direct-current machine of the second motor generator set to start and control the speed of operation of the induction motor.

7. In a control system for a wound rotor induction motor having stator and rotor windings, switch means operable to connect said stator winding to a main source of alternating-current power, a first motor generator set comprising an alternating-current machine connected directly to said rotor winding and a direct-current machine, a second motor generator set comprising a direct-current machine connected in electrical relation with the direct-current machine of the first motor generator set and an alternating-current machine, means operable to connect the alternating-current machine of the second motor generator set to the main power source to cause the second motor generator set to operate the first motor generator set and thereby energize the said rotor winding and induce a voltage in the said stator winding, first electroresponsive means operable to vary the excitation of the direct-current machine of the first motor generator set, first relay means jointly responsive to the frequencies of the power source and the stator winding operable to control the operation of said first electroresponsive means to cause the first motor generator set to operate at such speed as to match the frequency of the stator winding with that of the power source, second electroresponsive means operable to vary the excitation of the alternating-current machine of the first motor generator set, second relay means jointly responsive to the potentials of the power source and the stator winding operable to control the operation of said second electroresponsive means to cause said alternating-current machine to develop a voltage of such value as the voltage of the stator winding will match the voltage of the power source, and an automatic synchronizer connected between the power source and the stator winding operable to effect closure of said switch means to connect the stator winding to the power source in response to a synchronous condition therebetween.

8. In a control system for a wound rotor induction motor having stator and rotor windings, switch means operable to connect said stator winding to a main source of alternating-current power, a first motor generator set comprising an alternating-current machine connected directly to said rotor winding and a direct-current machine, a second motor generator set comprising a direct-current machine connected in electrical relation with the direct-current machine of the first motor generator set and an alternating-current machine, means operable to connect the alternating-current machine of the second motor generator set to the main power source to cause the second motor generator set to operate the first motor generator set and thereby energize the said rotor winding and induce a voltage in the said stator winding, first electroresponsive means operable to vary the excitation of the direct-current machine of the first motor generator set, first relay means jointly responsive to the frequencies of the power source and the stator winding operable to control the operation of said first electroresponsive means to cause the first motor generator set to operate at such speed as to match the frequency of the stator winding with that of the power source, second electroresponsive means operable to vary the excitation of the alternating-current machine of the first motor generator set, second relay means jointly responsive to the potentials of the power source and the stator winding operable to control the operation of said second electroresponsive means to cause said alternating-current machine to develop a voltage of such value as the voltage of the stator winding will match the voltage of the power source, an automatic synchronizer connected between the power source and the stator winding operable to effect closure of said switch means to connect the stator winding to the power source in response to a synchronous condition therebetween, and rheostat means operable to control the excitation of the direct-current machine of the second motor generator set whereby a decrease in the excitation thereof initiates the operation of the induction motor and determines the speed of operation thereof.

TRACY C. WETHERBY.